United States Patent [19]
Suppes

[11] Patent Number: 5,146,853
[45] Date of Patent: Sep. 15, 1992

[54] COMPACT MAGNETIC LEVITATION TRANSPORTATION SYSTEM

[76] Inventor: Galen J. Suppes, 4327 Morris Ct., Pearland, Tex. 77584

[21] Appl. No.: 616,237

[22] Filed: Nov. 20, 1990

Related U.S. Application Data

[63] Continuation-in-part of Ser. No. 376,437, Jul. 7, 1989, abandoned.

[51] Int. Cl.⁵ ............................................. E01B 25/00
[52] U.S. Cl. .................................. 104/138.2; 104/282
[58] Field of Search ............... 104/281, 282, 286, 290, 104/291, 292, 294, 130.1, 138.1, 138.2, 284, 293; 505/902, 903, 904, 906, 908

[56] References Cited

U.S. PATENT DOCUMENTS

| | | | |
|---|---|---|---|
| 3,638,093 | 1/1972 | Ross | 105/77 |
| 3,763,788 | 10/1973 | Pougue | 104/138.1 |
| 3,855,939 | 12/1974 | Woitsch | 104/281 |
| 3,924,538 | 12/1975 | Breitling et al. | 104/130.1 |

*Primary Examiner*—Robert J. Oberleitner
*Assistant Examiner*—Mark T. Le
*Attorney, Agent, or Firm*—Kenneth A. Roddy

[57] ABSTRACT

A compact magnetic levitation vehicle or car provides passenger comfort consistent with automobiles and travels suspended on ferromagnetic rails in evacuated tubes of minimal radial dimension extending between vehicle loading and unloading stations or at atmospheric conditions. A pair of guides extend outwardly along opposite sides of the vehicle and contain magnetic elements. Electrically conductive, ferromagnetic, magnetic, or electromagnetic sections in the rails correspond to the magnetic elements in the vehicle guides. Linear motors or controlled interaction with rail members provide propulsion and braking. Extensive portions of the evacuated tubes are provided with two sets of rails, one set of rails functionally located above the other. Rail switching is accomplished by selectively interacting with alternative levitation rails which are located at switching locations. Tube evacuation may be supplemented by vacuum pumps on the vehicle to draw in air during travel. The vehicle may have turbines which draw in air and exhaust compressed gases into cylinders.

24 Claims, 5 Drawing Sheets

COMPACT MAGNETIC LEVITATION TRANSPORTATION SYSTEM

CROSS REFERENCE TO RELATED APPLICATION

This application is a continuation-in-part of copending application Ser. No. 07/376,437, filed Jul. 7, 1989, now abandoned.

BACKGROUND OF THE INVENTION

1. Field of the Invention

This invention relates generally to magnetic levitation rail systems, and more particularly to a rail system based on a compact magnetic levitation car which can travel in an evacuated tube of minimal radial dimensions while allowing passenger comfort consistent with automobiles.

2. Brief Description of the Prior Art

Magnetic levitation vehicles and railways have been a practical reality for over a decade, and, for all the potential maglev transportation holds, the application of maglev trains has not gone past a few limited tracks which do little more than prove maglev systems work. An optimistic estimate for the maximum economical speed for a maglev train which is exposed to atmospheric pressure is approximately 570 mph. Compared to the 190 mph velocity of the fastest conventional train systems in France, the maglev train's velocity is approximately three times faster. This three-fold increase is at the expense of building a totally new and extremely expensive rail system. This additional speed simply has not proven to be enough incentive to warrant the capital expenditures which are necessary to replace existing train routes and compete with air travel.

The present invention entails major modifications to existing magnetic levitation vehicles with the goal of reducing implementation costs and expanding capabilities of the rail system. By basing a maglev rail system around a smaller maglev "car" rather than a maglev "train", the economics of using evacuated tubes to isolate the rail system from air resistance is greatly improved, and the capabilities of the rail system are expanded to include many aspects of transportation which are presently only feasible with private vehicles.

Minovitch, U.S. Pat. Nos. 3,954,064 and 4,075,948, discloses a train system which is operated in evacuated tunnels. Minovitch's invention takes advantage of the reduced energy losses of an evacuated railway system and has great fuel economy, but the system is based around a rather large and bulky train which is very expensive to build. Minovitch's system is based on gravitational energy and basic concepts of magnetic levitation and travel in evacuated environments. The present invention uses the reduced energy loss environment of evacuated tubes, but is much less expensive to build and is more like an automobile than a train. The present invention is based around maglev cars which can travel in much smaller tubes than the tunnels described in the above patents. These tubes cost less to construct than a lane of a highway, and the rail system in these tubes allows travel velocities greater than any jet aircraft.

Hirtz, U.S. Pat. No. 4,881,469 discloses a train system based on travel in tubes; however, Hirtz's system is based on complex switching methods involving moving rail and tube wall sections. The present invention does not rely on moving parts for switching and, beyond basic concepts of magnetic levitation, is not similar.

Pougue, U.S. Pat. No. 3,763,788 discloses a system for switching a high speed captive surface vehicle from a primary guideway to a secondary guideway by magnetic attraction. Pougue operates in a different manner than the present invention. Pougue utilizes laterally extending magnetic elements to exert lateral forces for guidance while upper monorail type magnetic elements provide attractive suspension. The present invention uses laterally extending magnetic elements which primarily exert vertical suspension forces. The laterally extending magnetic elements of the present invention can also be configured for attractive or repulsive suspension forces. Furthermore, as a source of suspension, the laterally extending magnetic elements of the present invention must provide continuous interactions on both sides of the vehicle. Pougue's system will allow suspension with either or both lateral rails being absent.

Breitling, U.S. Pat. No. 3,964,398, describes a switching system for maglev trains. This system is specific to trains where the suspension magnets are located at the bottom of the vehicle and may have significant distances without magnetic suspension interactions during the high radius corners required at high speed velocities. Also, embankment on the corner will interfere with the operation of Breitling's design.

Yamamura et al., U.S. Pat. No. 4,646,651, describes a method of stabilizing a maglev train. The magnet-rail configuration described in Yamamura's patent is effective, but is more sophisticated and expensive than is required to create the stability for the vehicles of the present invention.

Vinson, U.S. Pat. No. 4,307,668, and van der Heide, U.S. Pat. No. 4,356,772, describe methods of magnetic levitation. Each inventor applies his unique modification to improve magnetic levitation as prescribed by different goals and criteria.

Lichtenberg, U.S. Pat. No. 3,847,087 discloses a non-contact means of transferring electrical energy to be used by the vehicle.

Isolation of vehicle and passenger movements are described by Yamashita, U.S. Pat. No. 4,273,054, and Feistkorn, U.S. Pat. No. 4,259,908.

Steinmetz, U.S. Pat. No. 4,763,578 discloses methods of eliminating the propagation of vibrations due to levitation control methods at low velocities. Steinmetz's methods find applications in feedback-control methods of attractive levitation, whereas the present invention finds applications in repulsive levitation. In repulsive levitation, the changes in magnetic flux in rail elements at low travel velocities are not sufficient to induce the repulsive forces necessary to sustain levitation.

All the above mentioned patents are directed toward a "train" levitated by magnetic interactions and, in the case of Minovitch's patent, around the reduced air friction of an evacuated environment. Comparing a maglev "train" to the present maglev "car" is like comparing a bus to an automobile. It is important to note that the present invention is not merely a reduction in size. Accordingly, many of the switching and guidance systems which work well for a maglev "train" designed for velocities less than 570 mph are not appropriate for the present maglev "car" which operates at higher velocities and has different design criteria.

The present invention is distinguished over the prior art in general, and these patents in particular by a system utilizing a compact magnetic levitation vehicle which provides passenger comfort consistent with automobiles and travels suspended on ferromagnetic rails in evacuated tubes of minimal radial dimension extending between vehicle loading and unloading stations or at atmospheric conditions. A pair of guides extend outwardly along opposite sides of the vehicle and contain magnetic elements. Electrically conductive, ferromagnetic, magnetic, or electromagnetic sections in the rails correspond to the magnetic elements in the vehicle guides. Linear motors or controlled interaction with rail members provide propulsion an braking. Extensive portions of the evacuated tubes are provided with two sets of rails, one set of rails functionally located above the other. Rail switching is accomplished by selectively interacting with alternative levitation rails which are located at switching locations. Tube evacuation may be supplemented by vacuum pumps on the vehicle to draw in air during travel. The vehicle may have turbines which draw in air and exhaust compressed gases into cylinders.

The present invention places emphasis on repulsive levitation because repulsive levitation (1) provides stable levitation without feedback type of control methods, (2) has magnetic drag forces which decrease with increasing velocity, and (3) has increased levitation heights which decrease rail construction costs. The present system is also inherently safe from derailment since (1) the guides will be physically supported by the rails if levitation is lost, (2) the slope of the rail provides stable lateral control during levitation, and (3) the wall of the tube prevents lateral derailment of the vehicle.

SUMMARY OF THE INVENTION

It is an object of the present invention to reduce the capital costs associated with building a new rail system. While capital expenses regress desirable characteristics of a maglev train system, these economics are quite different for a maglev system designed for a smaller maglev car. The maglev tubes, rails, and supporting structures are smaller than those required for a train system and can be prefabricated. The raw material and prefabrication costs are roughly equivalent to a corresponding highway system. Actual ground preparation an construction costs are less than a highway since the ground requires a minimum of modifications. Also, the land needed for tube systems will not need to be fenced off as present railroad lines, airport runways, and highways must.

Another object of this invention to provide a transportation system with reduced operational costs. Since there are no constantly moving parts on the maglev vehicle, a maglev car actually costs less to construct and maintain than an automobile. Due to a unique switching system, the present maglev system is substantially automated which reduces both service and law enforcement related costs. Due to the virtual elimination of friction due to air or moving parts, energy consumption is also reduced to a small fraction of other transportation systems.

Another object of the present invention is to reduce detrimental impacts on the environment. Lowered energy consumption reduces both hydrocarbon and carbon dioxide emissions. Noise pollution is negligible in comparison to trains, planes, or automobiles.

Another object of this invention is to provide a maglev system in evacuated tubes which is much safer than alternative forms of transportation due to computer control, one-way travel rails, essential elimination of the possibility of derailment, the system being independent upon the condition of the driver, and the system not being influenced by weather conditions.

Another object of this invention is to reduce destination to destination travel times. This is perhaps the greatest advantage of the present transportation system based on a maglev car. In an evacuated tube, overcoming the speed of sound is much less energy intensive than at atmospheric pressure due to reduced fluid densities. Travel speeds of 2,000 miles per hour are quite reasonable, and, unlike air travel, a maglev car can take you to within a few hundred feet of your final destination. Business men can wake up in Houston, go to New York City and attend a meeting, and be back in Houston for lunch. The present system offers hypersonic travel velocities which have safety benefits common to ground transportation rail systems and applications to shorter travel distances most commonly traveled.

A further object of this invention is to provide a versatility which at present is only available with private vehicles. The present maglev rail system can be used for both intercity, intracity, and rural travel; moreover, vehicles can travel from destination to destination in a manner similar to the way an automobile starts out on a side-street, works its way to a freeway and finally back to a location at some other side-street.

The present maglev system will also have a beneficial impact on the economy and standard of living. By using automated vehicles for delivering packages and mail at a much faster rate than currently available, many aspects of business, research, and production can be enhanced. Reduced energy consumption can improve macroscopic economics and reduce pollution. Businesspersons will spend less time waiting at airports and awaiting travel connections. Travelers can go farther and faster for less. Two career families will have more versatility in choosing their working locations. Fewer people will die and be crippled due to automobile or plane crashes, and fewer animals will die due to collisions or isolated incidents such as oil spills.

The ultralight design of the present invention facilitates the realization of benefits in reduced vehicle construction costs by incorporating repulsive levitation methods at low velocities which eliminate the need for supplementary suspension methods. The vehicles of this invention have extremely low vehicular weight to passenger weight ratios due to design benefits from solid-state circuitry, high performance plastics, reduced air conditioning requirements due to the insulated travel in evacuated environments, reduced stabilization equipment related equipment due to isolation from atmospheric perturbations, and elimination of the need for supplementary suspension methods.

Other objects of the invention will become apparent from time to time throughout the specification and claims as hereinafter related.

The above noted objects and other objects of the invention are accomplished by a system utilizing a compact magnetic levitation vehicle which provides passenger comfort consistent with automobiles and travels suspended on ferromagnetic rails in evacuated tubes of minimal radial dimension extending between vehicle loading and unloading stations or at atmospheric conditions. A pair of guides extend outwardly along opposite sides of the vehicle and contain magnetic elements. Electrically conductive, ferromagnetic, electromagnetic sections in the rails correspond to the magnetic elements in the vehicle guides. Linear motors or controlled interaction with rail members provide propulsion and braking. Extensive portions of the evacuated tubes are provided with two sets of rails, one set of rails functionally located above the other. Rail switching is accomplished by selectively interacting with alternative levitation rails which are located at switching locations. Tube evacuation may be supplemented by vacuum pumps on the vehicle to draw in air during travel. The vehicle may have turbines which draw in air and exhaust compressed gases into cylinders.

DESCRIPTION OF THE PREFERRED EMBODIMENT

Figures 1, 2:
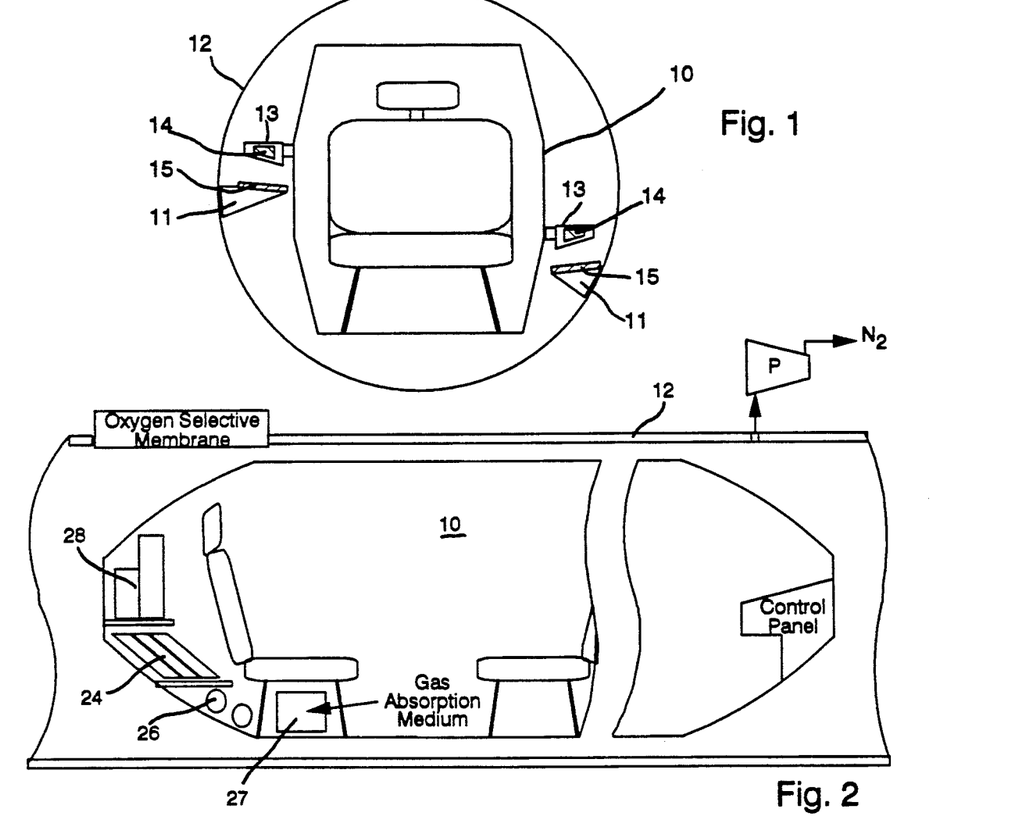
FIG. 1 is a transverse cross section of a tube having repulsive-interaction rails with a maglev car levitating thereon in accordance with the present invention.
FIG. 2 is a longitudinal cross section view of a portion of the maglev car of FIG. 1.
Figure 3:
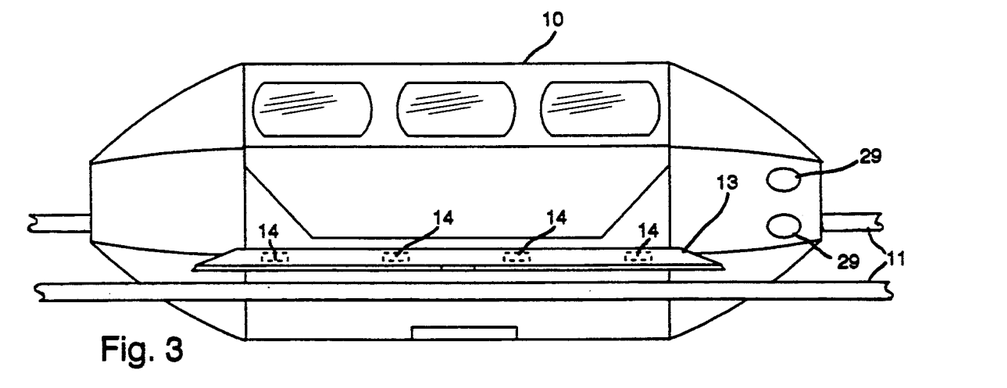
FIG. 3 is a side elevation view of the maglev car levitating above electrically conductive maglev rails through repulsive interactions.

The present magnetic levitation system (hereinafter referred to as "maglev") is based around a compact magnetic levitation car vehicle rather than a train; the relation between the present maglev car vehicle and a train is much like the relationship between an automobile and a bus. FIG. 1 shows somewhat schematically in transverse cross section, a preferred embodiment of the maglev car or vehicle 10 levitating on a pair of laterally spaced parallel rails 11 within a tunnel or tube 12. The maximum height or width of the maglev car 10 preferably is less than 55 inches but greater than 38 inches. By minimizing the dimensions of the vehicle, the construction costs of an evacuated rail system are substantially reduced while maintaining the standard of comfort consistent with automobiles. FIG. 2 shows the longitudinal cross section of the preferred car design. Both passenger and/or cargo capacity are increased by increasing the vehicle length and number (or width) of entrances. FIG. 3 shows a preferred exterior of the vehicle 10 levitating above rails 11.

Figure 5:
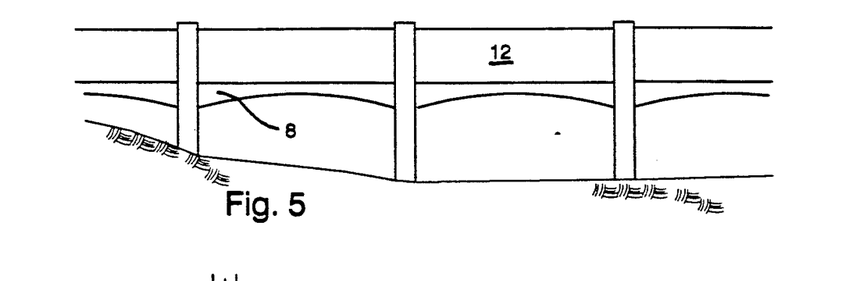
FIG. 5 is an illustration showing how prefabricated tube segments can be arranged to form a maglev tube system used in conjunction with a reinforcing brace and mounted on supports

As seen in FIG. 1, the maglev tube 12 is constructed of suitable material sufficient to withstand an external vacuum with a minimum of air leakage or deformation. Actual geometry of the tunnel or tube 12 is not limited to being cylindrical, and the outward appearance may range from being hidden underground to being transparent. FIG. 5 illustrates how above ground tubes 12 may appear in the countryside. Reinforcing braces B may be added to provide extra support against wind and gravitational forces. This reinforcement may be included on the tube sections during the prefabrication process or added at location.

It should be understood that although some of the more favorable qualities of this vehicle are related to high speed travel in evacuated tubes 12, the vehicle of this invention is not limited to travel in evacuated tubes.

It should also be understood, that the terms "suspension" and "levitation" are used interchangeably in this text; both referring to a body supported by magnetic forces.

The vehicle 10 is provided with a minimum of a pair of parallel guides 13 which extend outwardly from opposite sides of the vehicle and each extends longitudinally along the side of the vehicle. Magnetic elements 14 are contained in the guides 13, with a minimum of two horizontally aligned magnetic elements on one side and a minimum of one magnetic element on the opposite side. As will be discussed hereinafter, there are advantages to arranging the magnets 14, or guides 13 containing the magnets 14 symmetrically with respect to the longitudinal axis of the vehicle. The guides 13 may also include such things as protective enclosures, cooling elements, damping elements, and other devices.

Figure 4:
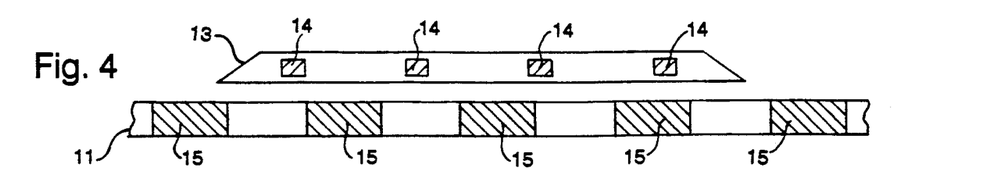
FIG. 4 is a side elevation of a guide of the vehicle levitated above a maglev rail having electrically conductive sections.

The preferred rail system comprises two parallel laterally and vertically spaced rails 11 secured to the interior of the tubes 12 each with electrically conductive media, such as aluminum sections 15 which correspond to the travel paths of the magnetic elements 14 located on the vehicle guides 13. The electrically conductive sections 15 may be continuous or longitudinally spaced (FIG. 4). Alternative embodiments can employ upper rails containing any combination of laminated or unlaminated, longitudinally spaced or continuous, magnetic, ferromagnetic or electrically conductive media. Depending upon the composition of the rails 11, repulsive or attractive magnetic interactions will supply levitation or suspension to allow the vehicle 10 to float by magnetic interactions.

The rail system utilizes rails 11 comprised in part of conductive media 15 to allow levitation through repulsive interactions. One type of preferred rail 11 has an inclined upper surface with sections of conductive media 15 which slopes toward the bottom of the suspended vehicle 10 as shown in FIG. 1. In this configuration, the upper surface has both lateral and vertical components; a combination of horizontal and vertical rails may also be used. Lateral components of the surfaces of the conductive media provide repulsive levitation and vertical components of surfaces of the conductive media provide lateral stability. Alternatively, coils or multiple phase wire geometries can be used to provide repulsive levitation, stability and propulsion or braking interactions. Also, a combination of horizontal and vertical rail sections may be used alternative to an inclined levitation surface.

Figure 19:
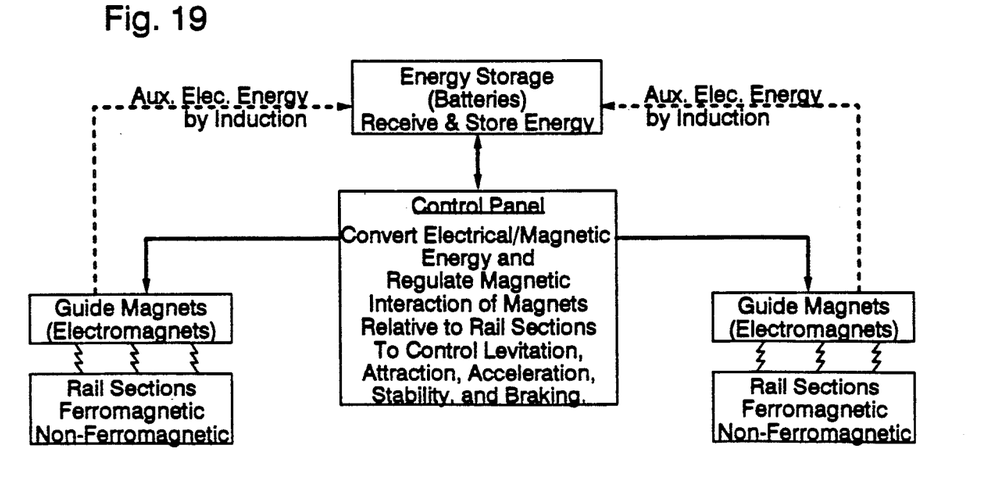
FIG. 19 is a schematic block diagram illustrating the maglev control system.

The overall operating system for the maglev system is illustrated schematically in FIG. 19. Non-contact propulsion and braking means are preferred due to distinct advantages in automation, reliability, and maintenance. Linear induction motor methods are used in the preferred embodiment of this invention. The preferred location of the motor is on the sides of the vehicle adjacent the rail members. This arrangement will facilitate lateral control while providing energy and/or conversion. Linear generators on other side locations or on arms which extend from the vehicle may also be incorporated. Alternative embodiments may combine inductive propulsion and levitation methods to provide rails 11 which both suspend, accelerate, and brake the vehicle. Likewise, alternative embodiments (described hereinafter) can employ upper rails 11A comprising any combination of laminated or non-laminated, longitudinally spaced or continuous, ferromagnetic or magnetic media.

The ultralight vehicle design allows for levitation through varying the magnetic fields in the magnets at stationary positions and during low velocities. According to Lenz's Law and Faraday's Law, the repulsive levitation force induced in a conductive rail is the result of an induced voltage which is approximated by equation 1.

$$V_E = \text{CONSTANT1} \frac{-d\Phi}{dt} \quad (1)$$

Where $V_E$ is voltage of a circuit encompassing the surface S and $\Phi$ is the integral of the magnetic field strength, $\beta$, over S. In this embodiment, S is part of the rail.

For the magnetic levitation vehicle of this invention, the magnetic elements 14 contained in the guide members 13 provide the source of the magnetic field. Changes in the value of the magnetic field with respect to time result from: (1) changing electrical currents in coils which are stationary with respect to the guide surface S; (2) changing positions of magnetic field sources with respect to the guide surface S; or (3) both changing relative positions of the magnetic elements 14 and changing electrical current in the coils.

For the preferred embodiment, an electromagnetic coil which is displaced in the longitudinal direction x over surface S of a circuit on the rail member 15 is described by equations 2 and 3.

Equations 2 and 3 combine to give equation 1 where in the preferred embodiment, the velocity is in the longitudinal direction and Constant1 in equation 1 is a function of both Constant2 and Velocity.

$$V_E = \text{CONSTANT2} \frac{-d\Phi}{dx} \quad (2)$$

$$\frac{dx}{dt} = \text{Velocity} \quad (3)$$

Changes in magnetic field strength due to varying currents in the magnetic coils can be halted to allow the vehicle to come to rest on a physical support.

Due to the flow of electrical currents in the coils contained on the vehicle guides, changes of electron flow in the coils results in varying the magnetic field strengths created by the coils. Induced magnetic fields in the rail members are due in part or entirely to varying magnetic field strengths resulting from changes of electron flow in the vehicle coils. Over portions of the rails, induction forces due to varying magnetic fields are necessary for creating the magnitude o induced magnetic fields necessary for suspension.

To dampen responses to perturbations, shock absorbers and suspension springs may be provided between the vehicle 10 and the guides 13, springs may be provided between the passenger seats and the vehicle 10, and magnets 14 may be actively controlled. Likewise, other methods conventional in the art may be used to insulate passenger and vehicle movements.

During maglev travel on the rails 11, the vehicle 10 has essentially no energy losses due to the friction of moving parts, and, if the vehicle travels in an evacuated tube 12, any air friction losses are also negligible. If significant, but low pressures are present in the tubes, air friction losses will be low compared to systems operating at atmospheric conditions. This performance reduces energy costs and allows for both less demanding propulsion methods and reduced maintenance.

In the preferred system, a plurality of vehicle loading and unloading locations are provided and the rails 11 extend between the loading and unloading stations. Rail sections designated for high speed travel will not be used for loading and unloading of vehicles, rather, loading and unloading locations will be on rail sections designated for that purpose. As described below, interchanges allow access to and from the vehicle loading and unloading locations and evacuation chambers allow vehicles to enter the tube from the outside environment.

Figure 7:
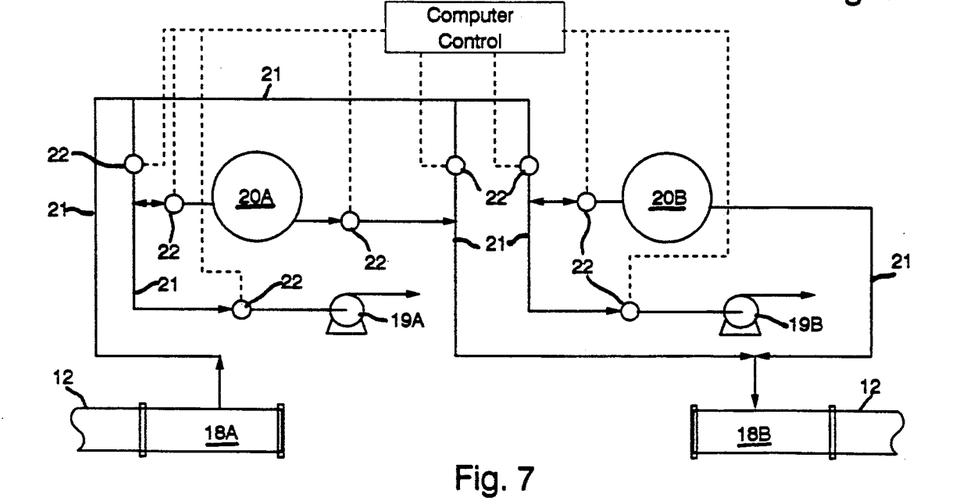
FIG. 7 is a schematic diagram of the preferred configuration and equipment for evacuation chambers in accordance with the present invention.

Represented schematically in FIG. 7, evacuation chambers 18A and 18B in the tubes 12 allow vehicles to enter or leave the evacuated tube 12 with minimal disturbance to the vacuum. A preferred evacuation system uses a combination of two vacuum pumps 19A and 19B, two vacuum vessels 20A and 20B, and a series of vacuum lines 21 and valves 22. A high vacuum pump 19A evacuates the high vacuum vessel 20A when not used directly on the evacuation chamber 18A. A low vacuum pump 19B evacuates the low vacuum vessel 20B when not used directly on the evacuation chamber 18A.

Vacuum sources (in increasing order of vacuum quality) include the low vacuum vessel 20B, low vacuum pump 19B, high vacuum vessel 20A, evacuation chamber 18B of vehicle leaving tube 12, and high vacuum pump 19A. A series of valves and vacuum lines connect all chambers, pumps, and vessels. A preferred evacuation process uses computer controlled valves to automatically draw vacuum from the lowest quality, available source which has a quality greater than the space being evacuated by a factor based on the economics and efficiency of the evacuation process. A similar conservation of entropy is used when vacuum is made available from a vehicle leaving a tube, this vacuum can be used to evacuate vessels 20A and 20B or chambers 18A or 18B.

Alternative passenger loading and unloading can be accomplished without the entire vehicle leaving the evacuated environment by sealing the end of a passageway around the vehicle entrance and creating a path at atmospheric conditions.

Figure 16:
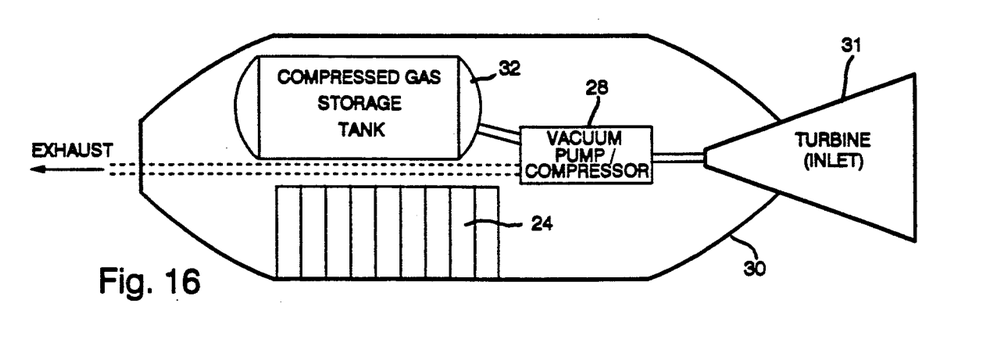
FIG. 16 is a schematic diagram a maglev vehicle designed to evacuate the tubes.

During high speed travel, the pressures at the front of the vehicle 10 are substantially greater than at static locations along the tube 12. It may therefore be desirable to maintain vacuums continuously by equipping the vehicles 10 with vacuum pumps 28 powered by batteries 24 to draw vacuum through ports 29 at the front of the vehicle during travel, as shown in FIGS. 2 and 3. During evacuation after major repairs of the tube 12, a vehicle 30, as shown in FIG. 16, and described hereinafter, may be used instead of, or in conjunction with stationary pumps located along the tubes 12.

Extremely large travel capacities are achieved by having the maglev vehicles 10 follow each other in close proximity at high velocities. Automation with appropriate monitoring apparatus (not shown) allows merging at very close proximities with minimal risk by the switching method described hereinafter.

Figure 6:
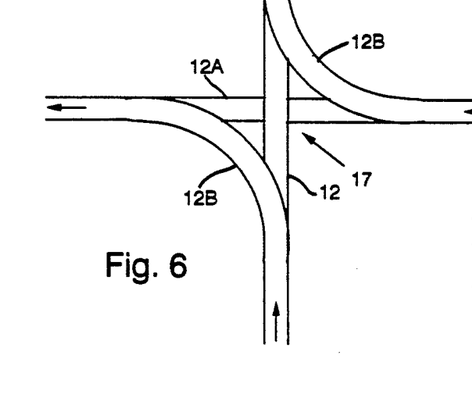
FIG. 6 is a schematic tube arrangement at the intersection of two one-way tubes.
Figure 8:
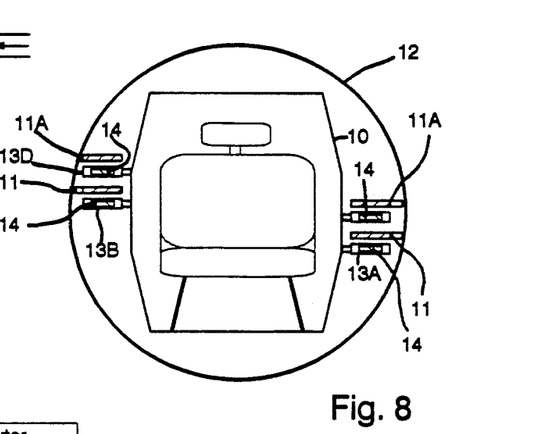
FIG. 8 is a transverse cross section of a tube having primary and merge rails with a maglev car having primary and secondary guides suspended thereon.

As shown in FIG. 6, interchanges 17 are used to switch between different tubes or rails and to get to and from evacuation chambers used for entering and leaving tubes 12. At a tube interchange 17, the maglev vehicle either continues in the same primary tube 12 or switches to a different primary tube 12A via a merge tube 12B. The path of the vehicle is determined by whether its magnets 14 are levitating on the rails 11 continuing in the primary tube 12 (as seen in FIG. 1), or on secondary alternative rails 11A (as seen in FIG. 8) switching into the merge tube 12B. This switching system requires a minimum of two pairs of rails 11 and 11A.

A preferred tube and rail arrangement for such a switching operation is pictured schematically in FIGS. 9A through 11C. When the vehicle 10 approaches a tube interchange 17 (FIG. 6), a second, or upper pair of rails 11A become available for interaction with the magnets 14 of the maglev vehicle. The upper rails 11A, are essentially the same construction as the rails 11 comprised in part of conductive media 15 and may also have an inclined upper surface which slopes toward the bottom of the suspended vehicle. The rails 11 and 11A are adjustable relative to the tube 12. This feature allows tube construction to have higher tolerances while allowing rails of greater precision.

Figure 9A:
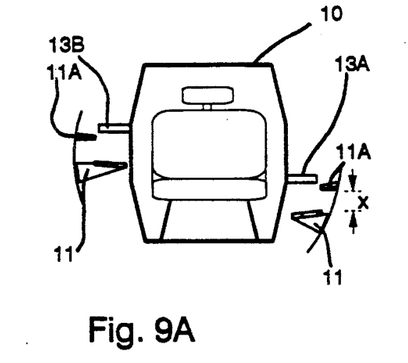
FIG. 9A is a transverse cross section of a vehicle levitating by repulsive magnetic interactions with both the upper and lower rail pairs and oriented with vehicle suspension means above upper rails.
Figure 9B:
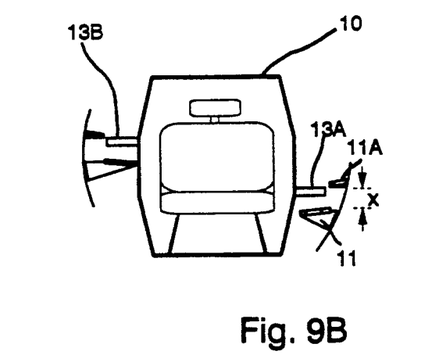
FIG. 9B is a transverse cross section of a vehicle levitating by repulsive magnetic interactions with the lower pair of rails.
Figure 10A:
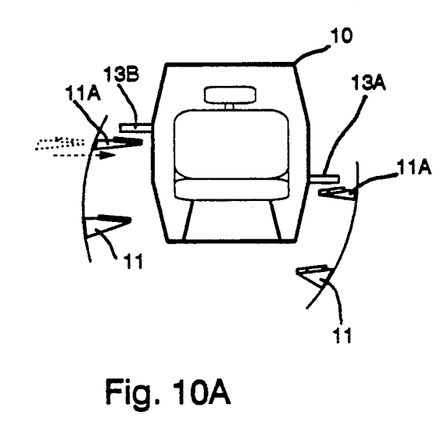
FIG. 10A is a transverse cross section of a vehicle levitating by repulsive magnetic interactions with the upper pair of rails where the rails are sufficiently separated vertically to allow lateral movement to the right without vehicle-rail collisions.
Figure 10B:
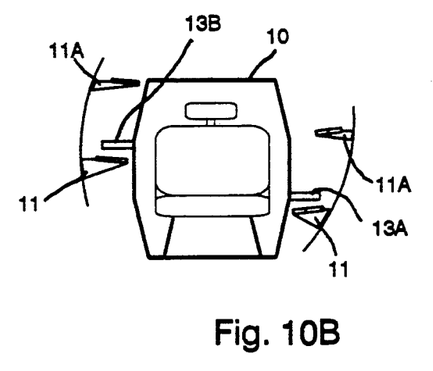
FIG. 10B is a transverse cross section of a vehicle levitating by repulsive magnetic interactions with the lower pair of rails where the upper and lower pair of rails are sufficiently separated vertically to allow lateral movement to the left without vehicle-rail collisions.
Figures 11A, 11B:
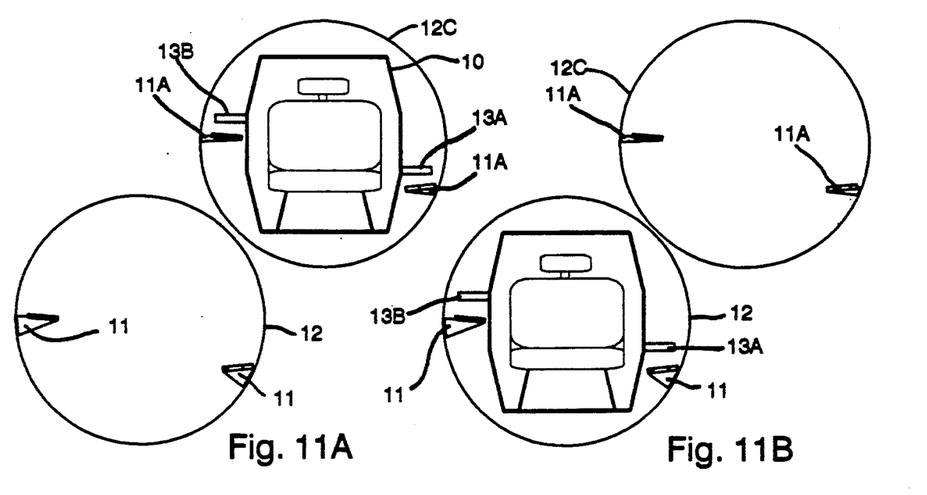
FIG. 11A is a transverse cross section of a vehicle levitating by repulsive magnetic interactions with the upper pair of rails where the rails are sufficiently separated vertically and laterally to allow tube sections to become independent without vehicle-tube collisions.
FIG. 11B is a transverse cross section of a vehicle levitating by repulsive magnetic interactions with the lower pair of rails where the lower and upper pair of rails are sufficiently separated vertically and laterally to allow tube sections to become independent without vehicle-tube collisions.

The second, or upper, set of rails 11A run parallel to the primary set of rails 11 for a distance sufficient for the vehicle 10 to transfer from repulsive levitation interaction with the bottom rail 11 (FIG. 9A) to repulsive levitation with the top rail 11A (FIG. 9B). After this distance, the space between the upper rails 11A and lower rails 11 increases first vertically and then also laterally. The paths of the two sets of rails 11 and 11A are dependent until the rails are gradually separated (FIGS. 10A and 10B) such that vehicle-rail collisions are no longer possible (FIGS. 11A and 11B). The tubes 12 are joined until vehicle-tube collisions are no longer possible (FIGS. 11A and 11B). The merging process proceeds in a manner reverse that of diverging.

Once the paths of the pairs of rails and 11A are independent, one pair of rails will merge with a different primary tube or evacuation chamber. As illustrated in FIGS. 10A, 10B, 11A, and 11B, by locating the guides 13 near a longitudinal center-line along the side of the vehicle 10, the distance the vehicle must move vertically before it is free to move laterally is minimized. By staggering the guides 13 such that one guide 3A is located below the centerline and the opposite guide 13B is located above the centerline (symmetric with respect to the longitudinal axis of the vehicle), the vertical travel distance necessary to prevent vehicle-rail collisions is reduced even further. An additional advantage of vertically staggering the guides 13A and 13B is that the lower guide 13A on one side allows easier access for entering the car from that side.

In the most elementary configuration, the guides 13A and 13B enter the switching location by levitating on the lower rails 11. The bottom surface of the upper rail 11A starts at the switching location at a distance X above the lower rails 11. (FIG. 9A). If upon entering the switching location the guides 13A and 13B are levitating at a position such that upper surface of the guides 13A and 13B are levitating at a distance lower than X, the vehicle 10 proceeds on the lower rails 11 (FIG. 9B). If upon entering the switching location the guides 13A and 13B are levitating at a position such that lower surface of the guides are levitating at a distance greater than X +[the thickness of the upper rail] (FIG. 10A), the vehicle proceeds on the upper rails 11A (FIG. 10B). In this configuration the vertical thickness of both the upper rail and the guide are minimized, the longitudinal ends of the upper rails 11A and guides 13A and 13B are beveled, and extensive control measures and backup control measures must be taken to control levitation height so a to prevent guide-rail collisions.

In more sophisticated embodiments, the inner side of the upper rails 11A enters from the sides of the tube 12. In an embodiment where the vehicle enters the switching location via the lower rails 11 (FIGS. 9A and 9B), repulsive interactions with the gradually appearing upper rails 11A will facilitate the vehicle guides 13A and 13B in positioning themselves in a stable position above or below the upper rails 11A (FIGS. 10A and 10B), thereby reducing the possibility of guide-rail collisions. Further vertical movement of the guides 13A and 13B accompanied by narrowing of the rails 11A can facilitate stable positioning (FIGS. 11A and 11B) to further safeguard against guide-rail collisions.

Figure 12:
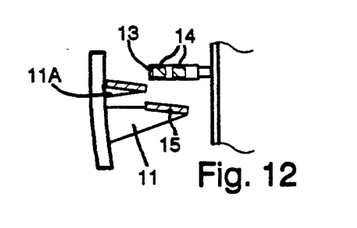
FIG. 12 is a schematic cross section showing a guide member having laterally spaced magnetic elements above a rail having laterally spaced electrically conductive sections.
Figure 13A:
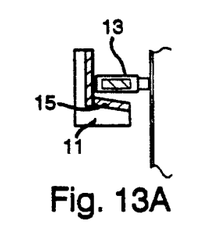
FIG. 13A is a cross section of a lower repulsion rail at a switching location where the guide of the maglev vehicle is positioned to continue on the lower rail.
Figure 13B:
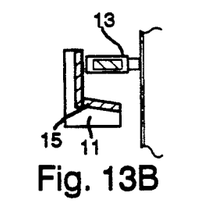
FIG. 13B is a lateral cross section of a lower repulsion rail at a switching location where the guide of the maglev vehicle is positioned to switch to the upper r il which has not yet appeared.

In the embodiment of this example, rail selection is determined by the magnetic excitation and levitation height of the vehicle guides 13A and 13B. As Seen in FIG. 12, to further facilitate switching, the guides 13A and/or 13B can incorporate laterally spaced magnetic elements within the guides and selective energization can be used to selectively interact with specific rail pairs 11 and/or 11A. Also, orientation angles of additional magnetic elements can be aligned to create selective interactions with switching rails. Laterally movable guides may also be used as an alternative to stationary guides. An outward extension of the guides will facilitate levitation with laterally spaced alternative rail members which can, in turn, proceed on an alternative, initially upward route.

Alternatively, the vehicle 10 can enter the switching location on the upper rails 11A. In this embodiment, the inner sides of the upper rails 11A must spread apart sufficiently to allow the car to slip between the upper rails and continue on the lower rails 11 if the energization of the levitation magnets are sufficiently low (FIGS. 9A and 9B). If the energization of the magnets in the guides 13A and 13B is sufficiently great, repulsive interactions with both the lower 11 and upper rail 11A will position the guides so as to continue on the upper rail 11A. Levitation height and magnet energization will allow the route of the vehicle to be determined before entering the switching location.

Having described the overall features of the preferred embodiment, several alternative switching methods will now be described with reference to FIGS. 8, 13A through 15B.

Embodiments using rails only capable of "attractive" interactions or rails capable of "repulsive and attractive" interactions are also possible. A totally attractive embodiment utilizes two laterally opposed parallel rails 11 containing ferromagnetic or magnetic sections 23 (FIGS. 14A through 15B).

An alternative embodiment, utilizing lower and upper rails 11 and 11A (FIG. 8) both of which provide levitation through "attractive" interactions requires additional, secondary guide members on each side of the vehicle. Additionally, these secondary guides will secure against derailment. In this embodiment, the primary guide members 13A and 13B are retractable. These secondary guide members 13C and 13D must be parallel to and above (or below) the primary guide members 13a and 13B. Rail switching is achieved by selective energization of either the lower guide members 13A and 13B or upper secondary guide members 13C and 13D. If the upper secondary guides 13C and 13D are selectively energized and levitation proceeds on the upper rails 11A, the lower guides 13A and 13B must be retracted. Laterally movable guides may also be used as an alternative to stationary guides. An outward extension of the guides will facilitate levitation with laterally spaced alternative rail members which can, in turn, proceed on an alternative, initially downward route. Only one guide is necessary in the movable guide embodiment. Safety rails located below the attractive levitation guides can be used as safety guides.

In this "attractive" levitation embodiment, magnets 14 in the upper secondary guides are able to counter excess upward force created by the magnets in the lower guides 13A and 13B. In embodiments where the magnets of the lower guides 13A and 13B facilitate propulsion with longitudinally spaced rail elements, these higher magnetic forces result in a greater propulsion. For arrangements using this propulsion method, a minimum of three magnets 14 are required in the lower guides 13A and 13B so as to maintain negligible net torque; a minimum of one magnet 14 is required above the rail 11.

In embodiments where the upper secondary guides 13C and 13D both facilitate in switching and in countering excess energization of the lower magnets, measures must be taken to ensure that attractive interactions of the upper rails 11A with the upper secondary guides 13C and 13D are not substantially reduced by attractive interactions of the upper secondary guides 13C and 13D with the lower rails 11 at switching locations. This is achieved by either vertically displacing the upper secondary guides 13C and 13D with respect to the lower guides 13A and 13B or by decreasing the height of the attractive elements of the lower rail 11 at switching locations.

An alternative embodiment has upper rails 11A levitating through "attractive" interactions (FIGS. 14B and 15B) being constructed in part of ferromagnetic or magnetic media 23 and lower rails 11 levitating through "repulsive" interactions (FIGS. 13A, 13B, 14A, and 15A) has distinct advantages in switching operations.

The method in which levitation and lane changes through "attractive" and "repulsive" interactions are achieved is best described by using the mathematical models given in equations 4 and 5 for a 1-loop coil with current I, area A, and constant $\mu$.

$$F \leq I^2/(2 \mu A 1^1) \qquad (4)$$

$$F = \mu I^2/(20 h) \qquad (5)$$

Equation 4 is an approximation of the levitation force for "attractive" levitation by a magnet located a distance 1 below the ferromagnetic rail. Equation 5 gives an approximation of the levitation force for "repulsive" levitation by a magnet located at a distance h above an electrically conductive rail. For a given vehicle and load, the required levitation force is constant and equal to the weight of the vehicle and load.

Figure 14A:
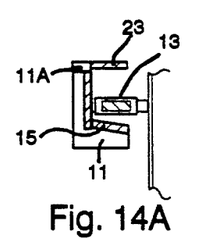
FIG. 14A is a cross section of an upper attractive rail and lower repulsion rail at a switching location where the guide of the maglev vehicle is positioned to continue on the lower rail and the guide is experiencing minimal effects due to the upper rail.
Figure 14B:
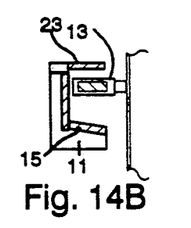
FIG. 14B is a cross section of an upper attractive type rail and lower repulsion type rail at a switching location where the guide of the maglev vehicle is in part levitating on the upper rail.
Figure 15A:
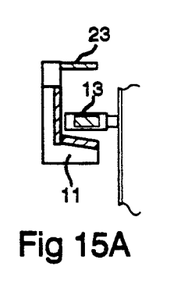
FIG. 15A is a cross section of an upper attractive rail and lower repulsion rail at a switching location where the guide of the maglev vehicle is positioned to continue on the lower rail and effects of the upper rail on the guide are negligible.
Figure 15B:
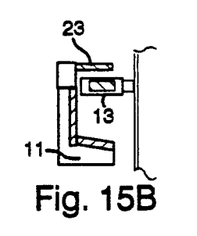
FIG. 15B is a cross section of an upper attractive rail and lower repulsion rail at a switching location where the guide of the maglev vehicle is levitating on the upper rail which is vertically deviating from the path of the lower rail.

The switching process of a guide located below an upper "attractive" levitation rail and above a lower "repulsive" levitation rail is a smooth transition from levitation with the bottom rail 11 (FIG. 13B) to levitation with the top rail 11A (FIGS. 14B and 15B). The levitating system switches from a stable levitation to a levitation requiring control. To switch from levitation by the bottom rail 11 to levitation with the top rail 11A, the current in the magnetic coils must be increased and an attractive levitation control loop must be implemented. This switching requires no moving parts and is as fast as the response time of the vehicle with respect to changes in energization of the magnetic means. For this embodiment, the upper rails 11A are only available at switching locations such as that shown in FIG. 6. Immediately after the switching process, a lower rail 11 will become available to allow the "attractive" mode of levitation to be replaced with a "repulsive" mode of levitation.

Having described the overall features of the preferred embodiment for a maglev car and alternative switching methods, additional features will be described which enhance performance.

During high speed travel, the pressures at the front of the vehicle 10 are substantially greater than at static locations along the tube 12. At times it is therefore more economical to maintain vacuums by equipping vehicles with vacuum pumps 28 which draw vacuum through ports 29 at the front of the vehicle. During evacuation after major repairs of the tube 12, a vehicle 30, as shown in FIG. 16, may be used instead of, or in conjunction with, stationary pumps located along the tubes 12.

The evacuation vehicles 30 have a large turbine 31 powered by batteries 24 exhausting air into a compressed air tank or cylinder 32 and can speed down the tube 12 taking in air while simultaneously compressing and storing the air in tanks or cylinders 32. Alternatively, rather than a turbine, the vehicle could have a large aerodynamically designed funnel directing air into a port where a compressor compresses the air and directs it for storage. In both embodiments, a series of these evacuation vehicles 30 greatly expedites the evacuation processes. The funnel embodiment may be more appropriate for lower initial tube air pressure applications. Similar embodiments which exhaust gases to the rear of the vehicle control air flow patterns in the tube.

To further assist evacuation of tubes, vehicles equipped with appropriate compressors could travel to locations in the tube, stop, connect to an energy supply and exhaust means and evacuate the tube 12 from a stationary position. This will allow compressors to be used for several different tunnel sections. It will also facilitate maintenance of pumps due to their portability and associated access to garages along the tube.

Embodiments exhausting air into the vehicle allow air supplies in the vehicle to be supplemented, especially if the vehicle is experiencing air leaks. During actual evacuation the tubes can be flooded with air to allow passengers to walk to safety after leaving the vehicle through an appropriate vehicle evacuation exit. Functionally, the compressor can draw in gases from any exterior point of the vehicle; however, as indicated previously, there are advantages to locating the inlet at the front of the vehicle.

The vehicle 10 (FIG. 2) must be able to maintain atmospheric pressure and maintain an oxygen supply 26 for the passengers without substantial losses to the vacuum tube environment. It should be understood that the vehicle has airtight seals around the vehicle door, around windows, and other non-moving parts. Reserve oxygen supply 26 disposed inside the car 10 is optional and may be either a compressed gas cylinder or liquefied gas tank under moderate pressure. These same liquefied gases can be used to cool superconducting magnets or capacitors whereby the evaporation losses create the latent energy absorption necessary to keep the circuitry cool. Carbon dioxide produced by the passenger(s) is either compressed in a cylinder or absorbed in absorption media 27.

Due to diffusion and leakage of air into the tubes, gases present in the tube will typically be diluted concentrations of air exterior to the tube. Since it is desirable to both minimize aerodynamic drag and maintain oxygen levels within the tube, it would be advantageous to selectively remove nitrogen from the tube environment or, alternatively, allow oxygen to selectively permeate into a tube reduce in pressure (e.g. to enrich the ratio of oxygen to nitrogen inside the tube). A particularly efficient method for allowing oxygen to permeate into a tube incorporates the use of oxygen selective membranes. These types of membranes are particularly suitable because membranes can use the oxygen pressure differential between the tube interior and the exterior as a driving force for the gas separation.

Figure 17:
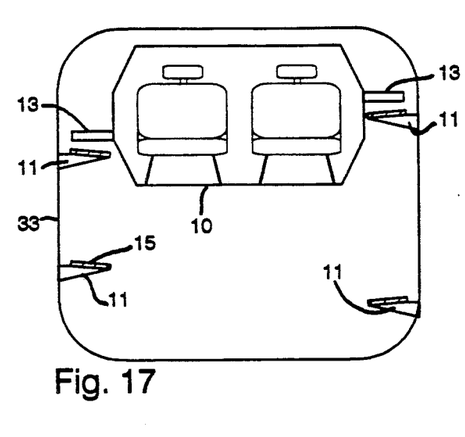
FIGS. 17 and 17A are transverse cross sections of a maglev tube designed for two-way traffic.
Figure 17A:
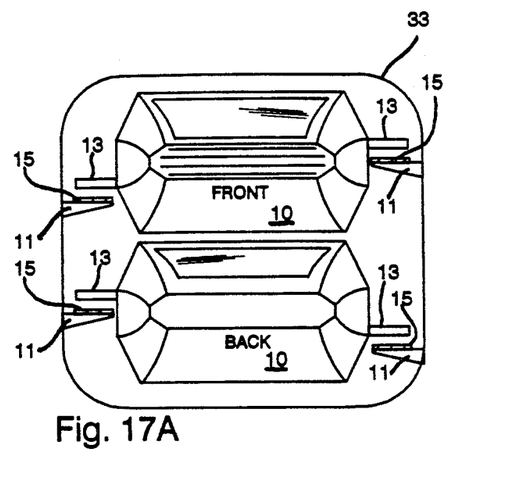

Although the maglev tubes 12 have been described as having rails 11 to accommodate one vehicle path, the preferred maglev system may also utilize tubes 33 which are high enough to accommodate two sets of rails 11 corresponding to two different maglev vehicle paths. Such tubes would typically appear as shown in FIGS. 17 and 17A. This is especially important for vehicles less than 70 inches in the vertical dimension. Tubes which are high enough for a person to comfortable walk through and work in during construction, maintenance, or emergency vehicle evacuation procedures have distinct advantages.

In addition, if the entire tube is twice the height of a vehicle 10 and is without interior obstacles such as rails crossing the middle of the tube, larger vehicles twice the height of a standard vehicle could travel the tubes during periods of low travel demand. This might involve switching the tubes from two-directional to one-directional during these times of low travel demand to allow transport of larger cargo.

Having a personalized "tram car" also has the advantage of being able to have the vehicle stop for the passenger at any location traveled by the rail system. Residential developments can be serviced by having the rail system adapted for personal rapid transit go through the neighborhood. Rather than keeping the vehicle at a garage located next to the house, the vehicle can kept in a common facility; from which the vehicle is available for use by a remote calling device. This will alleviate problems associated with having off ramps at each house.

The maglev system may provide service between cities, similar to current passenger trains, as well as within the same city, similar to a subway. For some legs of travel, it may be faster to proceed in part or entirely via rails exposed to the environment.

Figure 18:
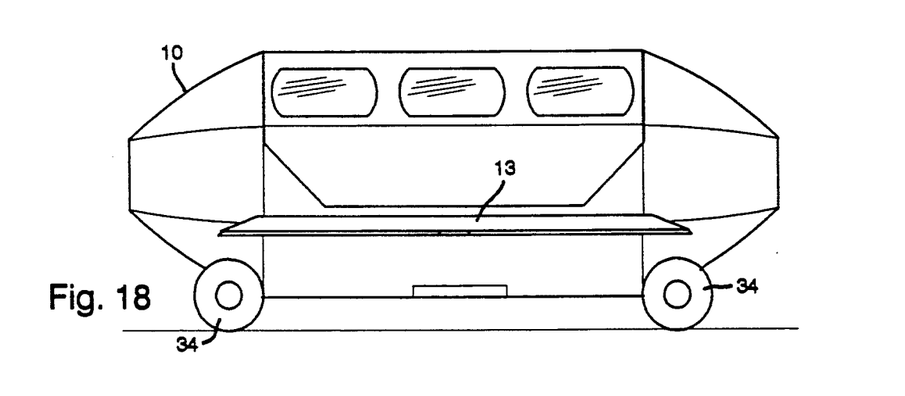
FIG. 18 is a schematic diagram a maglev vehicle having wheels.

The vehicle of the transportation system described herein is capable of being totally computer controlled. As such, cargo transport can be achieved without the presence of the atmospheric environment and without passenger seats. Embodiments involving vehicles with wheels 34 (FIG. 18) capable of travel off the rails will expand the abilities of this system. Also, separating tube sections for pressurization by isolating tube sections with doors between sections of tubing has distinct advantages.

While this invention has been described fully and completely with special emphasis upon several preferred embodiments, it should be understood that within the scope of the appended claims the invention may be practiced otherwise than as specifically described herein.

I claim:

1. A magnetic levitation transportation system comprising;

a plurality of vehicle loading and unloading stations, at least one primary pair of laterally spaced rails comprised of magnetically interactive material extending between said vehicle loading and unloading stations, a vehicle of a size such that its periphery is spaced inwardly from said primary rails and its interior is of a size to accommodate a person in a sitting position, a magnetic levitation means extending laterally along opposite sides of said vehicle and positioned such that one magnetic levitation means is above the longitudinal axis of said vehicle and the opposed magnetic levitation means is below the longitudinal axis of said vehicle and said magnetic levitation means positioned relative to said rails to exert a controlled vehicle force therebetween to levitate said vehicle, said magnetic levitation means being energized to exert a controlled vertical force on said primary rails to magnetically levitate said vehicle on said rails such that negligible torque is imparted to said vehicle and lateral motion of said vehicle is stabilized under normal operating conditions, energy conversion means for energizing said magnetic levitation means on said vehicle and for maintaining the speed and acceleration of said vehicle during travel, braking control means for creating a net braking force on said vehicle in a braking condition, and speed control means on said vehicle for accelerating and decelerating said vehicle.

2. A magnetic levitation transportation system according to claim 1 including 'tube sections enclosing substantial portions of said rails and having vehicle entering and exiting locations, said tube sections have evacuation chambers at said vehicle entering and exiting locations, vacuum means operatively associated with said tube sections for evacuating air and maintaining a vacuum in said tube sections, said evacuation chambers allowing vehicle to enter and leave the evacuated tube sections with minimal disturbance to the vacuum in said tube sections, and a climate control system in said vehicle for controlling the atmosphere of the interior of said vehicle to maintain passenger comfort when said vehicle is exposed to the vacuum in aid tube sections.

3. A magnetic levitation transportation system comprising:

a plurality of vehicle loading and unloading stations, at least one primary pair of laterally spaced rails comprised of magnetically interactive material extending between said vehicle loading and unloading stations, a vehicle of a size such that its periphery is spaced inwardly from said primary rails and its interior is of a size to accommodate a person in a sitting position, magnetic levitation means comprising a primary pair of parallel guide members extending laterally along opposite sides of said vehicle and positioned relative to the longitudinal axis of said vehicle and said guide members containing magnetic elements which are energized to exert a controlled vertical force on said primary rails to magnetically levitate said vehicle on said rails such that negligible torque is imparted to said vehicle and lateral motion of said vehicle is stabilized under normal operating conditions, a secondary pair of laterally spaced parallel merge rails comprised of magnetically interactive material and operatively associated with said primary rails for changing the path of travel of said vehicle, said merge rails extending longitudinally following the path of said primary rails and being vertically spaced relative thereto, said merge rails extending parallel to said primary rails for distance sufficient to transfer levitation from interaction with said primary rails to levitation interaction with said merge rails, energy conversion means for energizing said magnetic levitation means on said vehicle and for maintaining the speed and acceleration of said vehicle during travel, braking control means for creating a net braking force on said vehicle in a braking condition, and speed control means on said vehicle for accelerating and decelerating said vehicle.

4. A magnetic levitation transportation system according to claim 3 including a pair of parallel secondary guide members extending outwardly from opposite sides of said vehicle and each extending longitudinally along the sides of said vehicle parallel to said primary guide members and spaced vertically relative thereto whereby said primary rails are received therebetween.

5. A magnetic levitation transportation system according to claim 4 wherein at least one magnetic element is contained in at least one said secondary guide member on one side of said vehicle above said primary rail on the same side of said vehicle, whereby the magnetic element in said at least one secondary guide member serving to counter act excessive upward force created by the magnetic elements in said primary guide members to maintain negligible net torque on said vehicle, said vehicle magnetic elements comprise at least one propulsion electromagnet on at least one side of said vehicle adapted to be electrically energized for propulsion and including energy control means operatively coupled with said energy conversion means for controlling the energization of said propulsion electromagnet such that energization of said propulsion electromagnet will not upset the levitation stability created by interaction of all magnets on said vehicle, said primary rail members comprise sections of ferromagnetic material supported by a non-ferromagnetic material, propulsion control means operatively coupled with said energy control means for energizing said propulsion electromagnet at a position under a non-ferromagnetic region of said rail closer to a forwardly adjacent ferromagnetic section than from a forwardly adjacent ferromagnetic section in a manner to create a net forward propulsion force on said vehicle, reversible braking means operatively coupled with said energy control means for maintaining said propulsion electromagnet energized at a position under a non-ferromagnetic region of said rail and equally distant from the rearwardly adjacent ferromagnetic section and the forwardly adjacent ferromagnetic section in a manner to create a net braking force on said vehicle in the braking condition, said reversible braking means in the reversed condition energizing said propulsion electromagnet at a position under a non-ferromagnetic region of said rail closer to a forwardly adjacent ferromagnetic section than from a rearwardly adjacent ferromagnetic section in a manner to create an electrical current in said propulsion electromagnet, and said energy control means and said energy conversion means receiving and storing the electrical current generated in said propulsion electromagnet to maintain the speed and acceleration of said vehicle during travel.

6. A magnetic levitation transportation system according to claim 3 wherein said primary guide members on said vehicle are movable relative to said primary rails, whereby as the levitation interaction is being transferred from said primary guide members with said primary rails, said primary guide members are moved away from said primary rails and said vehicle becomes magnetically levitated on said merge rails by said primary guide members in their moved position and follows the path of said merge rails.

7. A magnetic levitation transportation system according to claim 3 wherein levitation is achieved by repulsive interactions between said primary rails and said vehicle guide members, and vehicle path is determined by levitation height of said vehicle relative to said primary rails and said merge rails at switching locations.

8. A magnetic levitation transportation system according to claim 3 wherein levitation is selectively achieved either by repulsive magnetic interaction between said vehicle guide members and aid primary rails or by attractive magnetic interaction between said vehicle guide members and said merge rails, and vehicle path is determined by levitation height of said vehicle relative to said primary rails and said merge rails at switching locations.

9. A magnetic levitation transportation system according to claim 3 wherein levitation is selectively achieved either by attractive magnetic interaction between said vehicle guide members and said primary rails or between said vehicle guide members and said merge rails, and said primary guides are retractable to allow vertical movement of said vehicle and prevent contact between said primary rails and said primary guides when levitation proceeds with said merge rails.

10. A magnetic levitation transportation system according to claim 2 wherein said vacuum means comprises;

high vacuum pump means operatively connected to said evacuation chambers, a high vacuum vessel connected to said high vacuum pump means, low vacuum pump means operatively connected to said evacuation chambers, a low vacuum vessel connected to said low vacuum pump means, and computer controlled valve means operatively connected with said high and low vacuum pump means, said high and low vessels, said evacuation chambers, whereby said high vacuum pump means is operated to evacuate said high vacuum vessel when not used directly on said evacuation chambers, and said low vacuum pump is be operated to evacuate said low vacuum vessel when not used directly on said evacuation chambers.

11. In a magnetic levitation transportation system having at least one pair of laterally spaced rails comprised of magnetically interactive material extending between vehicle loading and unloading stations and substantially enclosed by tube sections having vacuum means for evacuating and maintaining vacuum in the tube sections, a compact vehicle comprising;

a compact vehicle enclosure of a size such that its periphery is spaced inwardly from the interior of said tube sections and its interior is of a size to accommodate a person in a sitting position, said vehicle having air passageways at the front thereof connected to a turbine for drawing in air through said passageways during travel while simultaneously compressing and storing the compressed air in cylinders in said vehicle to evacuate said tube sections, magnetic levitation means extending laterally along opposite sides of said vehicle and positioned relative to the longitudinal axis of said vehicle and said rails to exert a controlled vertical force therebetween to levitate said vehicle, said laterally spaced rails being levitated upon extending neither above or below said vehicle at a point adjacent said vehicle, said magnetic levitation means being energized to exert a controlled vertical force on said primary rails to magnetically levitate said vehicle on said rails whereby negligible torque is imparted to said vehicle and lateral motion of said vehicle is stabilized under normal operating conditions.

12. The vehicle according to claim 11 including;

energy receiving and conversion means in said vehicle for receiving and converting energy to accelerate, decelerate, and maintain the speed of said vehicle during travel, and braking control means on said vehicle operatively coupled with said energy receiving and conversion means and said magnetic elements on said vehicle to create a net braking force on said vehicle in a braking condition.

13. The vehicle according to claim 11 including;

energy storage and conversion means in said vehicle for converting stored energy to accelerate, decelerate, and maintain the speed of said vehicle during travel, and braking control means on said vehicle operatively coupled with said energy storage and conversion means and said magnetic levitation means on said vehicle to create a net braking force on said vehicle in a braking condition.

14. A vehicle according to claim 13 including electrical generating means on the exterior of said vehicle operatively coupled to said energy storage means for providing supplemental electrical energy.

15. A vehicle according to claim 11 wherein
said vehicle enclosure is sealed to maintain atmospheric pressure and provided with liquid oxygen supply means for passengers and carbon dioxide capturing means for collecting carbon dioxide produced by the passengers, whereby
said liquid oxygen supply means provides evaporation to both replace consumed oxygen and to provide a latent energy transfer for cooling electrical circuitry.

16. A vehicle according to claim 11 including
wheels and ground suspension means on said vehicle whereby said vehicle is capable of travel both on land and said rails.

17. A magnetic levitation transportation system comprising;
a plurality of vehicle loading and unloading stations,
at least one primary pair of laterally spaced rails comprised of magnetically interactive material extending between said vehicle loading and unloading stations,
tube sections enclosing substantial portions of said rails and having vehicle entering and exiting locations, said tube sections having an environment reduced in partial pressure of nitrogen,
gas removal means associated with said tube sections for removing nitrogen gases from said tube sections,
a vehicle having magnetic levitation means capable of being energized to exert a controlled vertical force on said primary rails to magnetically levitate said vehicle on said rails whereby negligible torque is imparted to said vehicle and lateral motion of said vehicle is stabilized under normal operating conditions,
gas intake means on said vehicle for taking in gases present in said tube sections, and
gas compressing means on said vehicle coupled with said gas intake means for compressing the gases taken in and discharging the compressed gases into storage means.

18. A magnetic levitation transportation system according to claim 17 in which
said compressing means has an inlet at the front of said vehicle.

19. A magnetic levitation transportation system according to claim 17 including
exhaust means associated with said compressing means for directing said compressed gases to the exterior of both said vehicles and said tube sections.

20. A magnetic levitation transportation system comprising
a plurality of vehicle loading and unloading stations,
at least one primary pair of laterally spaced rails comprised of magnetically interactive material extending between said vehicle loading and unloading stations,
tube sections enclosing substantial portions of said rails and having vehicle entering and exiting locations, said tube sections having an environment reduced in partial pressure of nitrogen,
a vehicle having magnetic levitation means capable of being energized to exert a controlled vertical force on said primary rails to magnetically levitate said vehicle on said rails whereby neglible torque is imparted to said vehicle and lateral motion of said vehicle is stabilized under normal operating conditions,
gas separating means for increasing the oxygen-to-nitrogen ratio of the gases within said tube sections to a ratio larger than that of the earth atmosphere exterior of said tube sections such that vehicle travel resistance due to nitrogen gas in said tube sections is reduced.

21. A magnetic levitation transportation system according to claim 20 in which
said gas separation means comprises oxygen enriching membranes separating the interior from the exterior of said tube sections to increase the oxygen-to-nitrogen ratio.

22. A magnetic levitation transportation system for a plurality of vehicle comprising;
a plurality of vehicles loading and unloading stations,
at least one primary pair and at least one secondary pair of laterally spaced rails comprised of magnetically interactive material extending between said vehicle loading and unloading stations and said secondary rails extending longitudinally following the path of said primary rails and being vertically spaced relative thereto,
tube sections enclosing substantial portions of said laterally spaced rails and having vehicle entering and exiting locations, and
at least two compact vehicle each of a size such that its periphery is spaced inwardly from said laterally spaced rails and each of sufficient height such that at least two said vehicles may be accommodated within said tube sections in vertically spaced relation with one said vehicle being levitated on said primary pair of rails and another said vehicle being levitated on said secondary pair of rails,
magnetic levitation means extending laterally along opposite sides of each said vehicle and positioned relative to the longitudinal axis of said vehicle and said magnetic levitation means of each said vehicle positioned relative to the respective said pair of laterally spaced rails to exert a controlled vertical force therebetween to levitate said vehicle,
said magnetic levitation means being energized to exert a controlled vertical force on said laterally spaced rails to magnetically levitate one said vehicle on said primary pair of rails and another vehicle on said secondary pair of rails whereby negligible torque is imparted to each said vehicle and lateral motion of each said vehicle is stabilized under normal operating conditions,
said tube sections and said laterally spaced rails being free of obstacles crossing the center of said tube sections and said laterally spaced rails having no portion extending between the top and bottom surfaces of said vertically spaced vehicles.

23. A magnetic levitation transportation system according to claim 1 wherein;
said at least one pair of laterally spaced rails is comprised of sections of electrically conductive material and sections of non-ferromagnetic material extending between said vehicle loading and unloading stations, and
said magnetic levitation means comprises magnetic levitation coil means arranged on opposing sides of said vehicle and positioned relative to the longitudinal axis of said vehicle and said laterally spaced rails to exert a controlled vehicle force therebetween to levitate said vehicle,
said magnetic levitation coil means being energized to exert a controlled vertical force on said laterally spaced rails to magnetically levitate said vehicle on said rails whereby negligible torque is imparted to said vehicle and lateral motion of said vehicle is stabilized under normal operating conditions, said vehicle is suspended by repulsive magnetic interactions induced in said rails by said coil means and changes of electron flow of said coil means is controlled by varying magnetic field strengths created by said coil means, induced magnetic fields in said rails are due at least in part to varying magnetic field strengths resulting from propulsion of said vehicle relative to said rails, and induction forces due to varying magnetic fields over portions of said rails are of sufficient magnitude to suspend said vehicle relative to said rails.

24. A magnetic levitation transportation system according to claim 23 in which the electron flow of said coil means alternate in a sinusoidal manner.

* * * * *